Patented June 9, 1931

1,809,457

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ACCELERATOR OF VULCANIZATION

No Drawing.   Application filed December 10, 1927.   Serial No. 239,267.

My invention relates to the treatment of rubber and it has particular relation to the provision of a new class of materials which, when incorporated in rubber compounds, materially accelerate the rate of vulcanization thereof.

More specifically, the invention has for one of its objects the provision of an accelerator material which may be manufactured economically and which, when added to rubber insures proper vulcanization thereof within a relatively short period of time.

Another object of the invention consists in the provision of an accelerator of vulcanization of rubber which is composed of the reaction product of certain alkali salts of mercaptans with an organic sulfur halide.

Heretofore, it has been observed that certain sulphur containing organic compounds, for example thiocarbamates and xanthogenates, when incorporated into a rubber compound, greatly accelerate the rate of vulcanization of the latter. This invention consists in the discovery that certain salts of sulphur containing compounds, for example the sodium salt of diethyl dithiocarbamate or the sodium salt of mercaptobenzothiazole, may be caused to react with such organic halogen sulfides as 2-benzoyl 4-nitro phenyl sulphur bromide, to produce substances having excellent properties as accelerators of the rate of vulcanization of rubber. These compounds may be manufactured comparatively easily and inexpensively and when dispersed into the rubber compound they insure a uniform mixture.

The reaction product of 2-benzoyl 4-nitro phenyl sulphur bromide with sodium diethyl dithio carbamate, cited above, is a typical substance of this class. This material may be prepared as follows:

Dissolve 2-benzoyl 4-nitro phenyl sulphur bromide (16.9 parts) and sodium diethyl dithiocarbamate (8.5 parts) in dry benzol. Heat the mixture to the boiling point of the solvent under a reflux condenser for a period of approximately one hour and then distill off the volatile constituents on a steam bath. The residue obtained is poured into boiling water to remove any traces of benzol that may remain after the distillation upon the water bath. The residue is obtained from the water solution in the form of a caked mass which readily dissolves in hot water. The mechanics of the reaction taking place may be represented by the following structural formula:

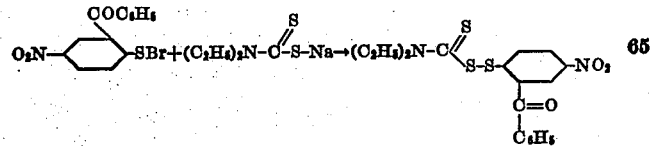

The reaction product of 2-benzoyl 4-nitro phenyl sulphur bromide with the sodium salt of mercaptobenzothiazole is another compound of this same general class which is an excellent accelerator of vulcanization. This material may be prepared as follows:

Dissolve the sodium salt of mercaptobenzothiazole (8.35 parts) in boiling alcohol and allow the solution to cool until it is luke warm. Then add to the solution 17 parts of 2-benzoyl 4-nitro phenyl sulphur bromide. The solution thus obtained assumes a dark red color for a short time. This color, however, soon disappears and a yellow precipitate is formed. The solution containing the precipitate is boiled for a period of one hour and is then cooled and filtered. The precipitate may be washed with water and then air dried. If it is desired to obtain the product in a purified form, the washed precipitate may be recrystallized from benzol.

The same material may be obtained by the interaction of the basic materials in the presence of anhydrous aluminum chloride. According to this method, 2-benzoyl 4-nitro phenyl sulphur bromide (85 parts) are suspended in dry carbon bisulphide. To this suspension are added 42 parts of mercaptobenzothiazole and 45 parts of aluminum chloride ($AlCl_3$). No reaction occurs at room temperature. However, if the mixture is refluxed for a period of two hours or more, hydrogen bromide (HBR) begins to be evolved.

Preferably, the mixture is permitted to remain under the reflux condenser for a period of several hours (12 or 16 hours). The reaction product is then heated in a steam bath in order to drive off the volatile components of the mixture. The residue is poured upon ice water, filtered, washed with water and dried. This product is then recrystallized from benzol and is obtained therefrom in the form of colorless needles having a melting point between 122° and 123° C. The yield obtained is practically quantitative.

The reaction of 2-benzoyl 4-nitro phenyl sulphur bromide with the sodium salt of mercaptobenzothiazole may be represented by the following structural formula:

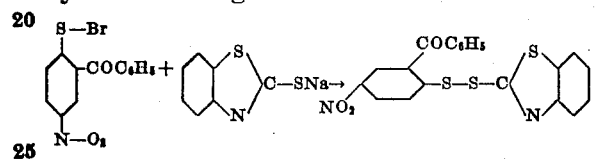

My invention of course is not limited to the particular halogen reaction product of 2-benzoyl 4-nitro phenyl sulphur halide, but it includes various other halides of that material, for example, the chlorides or the iodides. Neither is the sodium salt of mercaptobenzothiazole the only material of that class which may be employed, for the potassium or other alkali salt may be employed in the same capacity.

These materials may be employed as accelerators in various rubber compounds with excellent results. The following is an example of a compound which insures an excellent product:

| | |
|---|---|
| Extracted rubber | 100 parts |
| Zinc oxide | 5 parts |
| Sulphur | 3 parts |
| Stearic acid | 1.5 parts |
| Accelerator | .5 part |

Samples of material prepared in accordance with the foregoing formula in which various of the compounds previously discussed were employed as accelerators, were subjected to vulcanization and were then tested to ascertain their tensile strength and elasticity. The results of these tests are contained in the following table:

*2-benzoyl 4-nitro phenyl sulphur bromide and mercaptobenzothiazole*

| Cure | Load in kgs/cm² at 700% elong. | Tensile strength kgs/cm² | Per cent elong. |
|---|---|---|---|
| :45 at 20# | 15 | 40 | 910 |
| 1:10 at 20# | 35 | 100 | 900 |
| :30 at 40# | 48 | 110 | 835 |

*2-benzoyl 4-nitro phenyl sulphur bromide and sodium diethyl dithiocarbamate*

| | | | |
|---|---|---|---|
| :20 at 20# | 56 | 122 | 840 |
| :45 at 20# | 120 | 200 | 790 |
| :30 at 40# | 122 | 200 | 835 |

From the preceding table it will be evident that the compounds included with the scope of the invention are rapid accelerators. They also result in a product having a high degree of tensile strength and elasticity.

Although I have described in detail only the preferred embodiments of the invention, it will be apparent to those skilled in the art that it is not so limited but that various minor modifications may be made therein without departing from the spirit of the invention or from the scope of the appended claims.

What I claim is:

1. A method of treating rubber which comprises vulcanizing it in the presence of a material having the following structural formula:

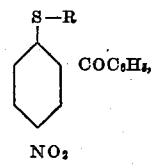

in which R represents a dithiocarbamate radical.

2. A rubber product that has been vulcanized in the presence of the reaction product of benzoyl nitro phenyl sulphur halide and an alkali salt of a dithiocarbamate.

3. A rubber product that has been vulcanized in the presence of the reaction product of a nitro benzoyl phenyl sulphur halide and an alkali salt of a diethyl dithiocarbamate.

4. A rubber product that has been vulcanized in the presence of the reaction product of a benzoyl nitro phenyl sulphur halide and a sodium salt of a diethyl dithiocarbamate.

5. A rubber product that has been vulcanized in the presence of the reaction product of 2-benzoyl 4-nitro phenyl sulphur bromide and the sodium salt of diethyl dithiocarbamate.

6. A rubber product that has been vulcanized in the presence of a material having the following structural formula:

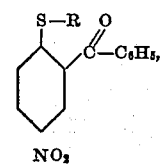

in which R represents a dithiocarbamate.

7. A method of accelerating the rate of vulcanization of rubber which comprises heating it in the presence of a material having the following formula:

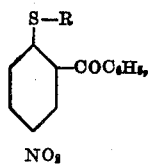

in which R is a material selected from a group consisting of thiazyl and dithio carbamates.

8. A rubber product that has been vulcanized in the presence of a material having the formula:

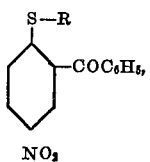

in which R is a material selected from a group consisting of benzo thiazyl sulphides and dialkyl dithio carbamates.

In witness whereof, I have hereunto signed my name.

Signed at Akron, in the county of Summit, and State of Ohio, this 9th day of December, 1927.

JAN TEPPEMA.